US012579225B2

(12) United States Patent
Okuda et al.

(10) Patent No.: US 12,579,225 B2
(45) Date of Patent: Mar. 17, 2026

(54) REMOTE AUTHORIZATION CONTROL SYSTEM, RESOURCE ACCESS APPARATUS, AUTHENTICATION APPARATUS, REMOTE AUTHORIZATION CONTROL METHOD AND PROGRAM

(71) Applicant: NTT, Inc., Tokyo (JP)

(72) Inventors: Tetsuya Okuda, Tokyo (JP); Koji Chida, Tokyo (JP); Yuichiro Dan, Tokyo (JP)

(73) Assignee: NTT, Inc., Tokyo (JP)

( * ) Notice: Subject to any disclaimer, the term of this patent is extended or adjusted under 35 U.S.C. 154(b) by 232 days.

(21) Appl. No.: 18/261,920

(22) PCT Filed: Feb. 16, 2021

(86) PCT No.: PCT/JP2021/005731
§ 371 (c)(1),
(2) Date: Jul. 18, 2023

(87) PCT Pub. No.: WO2022/176023
PCT Pub. Date: Aug. 25, 2022

(65) Prior Publication Data
US 2024/0089259 A1 Mar. 14, 2024

(51) Int. Cl.
*G06F 21/10* (2013.01)
*H04L 9/40* (2022.01)

(52) U.S. Cl.
CPC ............ *G06F 21/10* (2013.01); *H04L 63/101* (2013.01)

(58) Field of Classification Search
CPC .............................. G06F 21/10; H04L 63/101
See application file for complete search history.

(56) References Cited

U.S. PATENT DOCUMENTS

| | | | | |
|---|---|---|---|---|
| 10,536,443 B2 * | 1/2020 | Jellison, Jr. | ........... | H04W 12/06 |
| 11,019,049 B2 * | 5/2021 | Jellison, Jr. | ........... | H04W 12/30 |
| 11,876,792 B2 * | 1/2024 | Jellison, Jr. | ............. | H04L 63/10 |

(Continued)

FOREIGN PATENT DOCUMENTS

| | | |
|---|---|---|
| JP | 2008-251007 | 10/2008 |
| JP | 2008-299457 | 12/2008 |
| JP | 2014-509766 | 4/2014 |

OTHER PUBLICATIONS

Wikipedia DRM https:/// en.wikipedia.org/wiki/Digital_rights_management (retrieved on Jan. 17, 2021).

(Continued)

*Primary Examiner* — Yonas A Bayou
(74) *Attorney, Agent, or Firm* — IPUSA, PLLC

(57) ABSTRACT

In a remote authorization control system including a resource access device, a resource management device, and an authentication device, the resource access device downloads an access control list from the authentication device onto a secure region in the resource access device. The resource access device downloads resources from the resource management device onto the secure region. The resource access device determines whether a user is allowed to use the resources based on the access control list when a resource use request is received from the user, and the resources access device allows the user to use the resources when the resources are usable.

5 Claims, 13 Drawing Sheets

(56)                     References Cited

U.S. PATENT DOCUMENTS

| | | | | |
|---|---|---|---|---|
| 2004/0172561 | A1* | 9/2004 | Iga | G06F 21/10 |
| | | | | 726/26 |
| 2012/0255026 | A1* | 10/2012 | Baca | H04L 63/08 |
| | | | | 726/26 |
| 2023/0095576 | A1* | 3/2023 | Ureche | H04L 63/10 |
| | | | | 726/26 |

OTHER PUBLICATIONS

Wikipedia Access-control list https:// en.wikipedia.org/wiki/Access-control_list (retrieved on Jan. 7, 2021).

* cited by examiner

REMOTE AUTHORIZATION CONTROL SYSTEM, RESOURCE ACCESS APPARATUS, AUTHENTICATION APPARATUS, REMOTE AUTHORIZATION CONTROL METHOD AND PROGRAM

TECHNICAL FIELD

The present invention relates to a technology for controlling availability of digital content in an information communication field.

BACKGROUND ART

As a technology for controlling availability of digital content, access control based on a digital rights management (DRM) or an access control list (ACL) is known.

DRM is a mechanism that manages copyright of digital content (hereinafter referred to as resources). The user obtains encrypted resources by a package, distribution or the like. The acquired resources are decrypted with a decryption key by using browsing software or the like on a user terminal. The decryption key may be embedded in the browsing software or may be distributed from an NW (NPL 1).

In access control by an ACL, access propriety is determined by using an access control list or the like when the user browses the resource, and when access is permitted, the resource is downloaded from the server to the user terminal and used (NPL 2).

CITATION LIST

Non Patent Literature

[NPL 1] Wikipedia DRM https:///en.wikipedia.org/wiki/ Digital rights management (retrieved on 2021/1/7)
[NPL 2] Wikipedia Access-control list https://en.wikipedia.org/wiki/Access-control list (retrieved on 2021/1/7)

SUMMARY OF INVENTION

Technical Problem

In DRM of the related art, since a decryption key is transferred to a user terminal, the decryption key leaks due to reverse engineering or the like, and a DRM function cannot be achieved. In recent years, there has come to be a technology for safer management by storing a key in a secure region such as a trusted execution environment (TEE). However, since there is a possibility of leakage due to a side channel attack, a complete solution has not been achieved.

On the other hand, in the access control of the related art by the ACL, it is necessary to download resources at the time of use. Therefore, when a data size of the resources is large, there is a problem that a download waiting time becomes long. Since a process on cloud is necessary, there is a problem that availability is low.

In view of the foregoing circumstances, an objective of the present invention is to provide a resource availability control technology that is safer than a technology of the related art and is capable of shortening a waiting time during use.

Solution to Problem

According to the disclosed technology, a remote authorization control system includes a resource access device, a resource management device, and an authentication device.

The resource access device downloads an access control list from the authentication device onto a secure region in the resource access device.

The resource access device downloads resources from the resource management device onto the secure region.

The resource access device determines whether a user is allowed to use the resources based on the access control list when a resource use request is received from the user, and the resources access device allows the user to use the resources when the resources are usable.

Advantageous Effects of Invention

According to the disclosed technology, it is possible to provide a resource availability control technology that is safer than a technology of the related art and is capable of shortening a waiting time during use.

DESCRIPTION OF EMBODIMENTS

An embodiment of the present invention (the present embodiment) will now be described with reference to the drawings. Embodiments to be described below are merely exemplary, and the embodiments to which the present invention is applied are not limited to the following embodiments.
(Overview of Embodiment)
A trusted execution environment (TEE) which is a function capable of safely executing critical processing independently of an OS, has been included in recent machines. The machine includes a terminal such as a smart phone in addition to a server or the like.

A machine that has a TEE function has a secure region (which may be referred to as Enclave) that does not leak data to the outside. In particular, a TEE such as SGX of Intel (registered trademark) has a structure (remote attestation) for guaranteeing that a correct program is operating in a secure region with respect to the outside of the secure region (for example, a remote user or server communicating with the machine). Although the "remote attestation" used in this embodiment assumes a structure in SGX of Intel (registered trademark), it is not limited thereto. Any structure may be used as long as the structure has a similar function.

In the present embodiment, an ACL (a list in which whether a user can access each resource is stated) is managed on the TEE. The resources are downloaded into the secure region of the TEE before the resources are browsed. However, at this time point, resources cannot be used yet.

After the ACL on the TEE determines that the resources can be used, the resources can be transmitted to the outside of the secure region for use.

(System Configuration)

Figure 1:
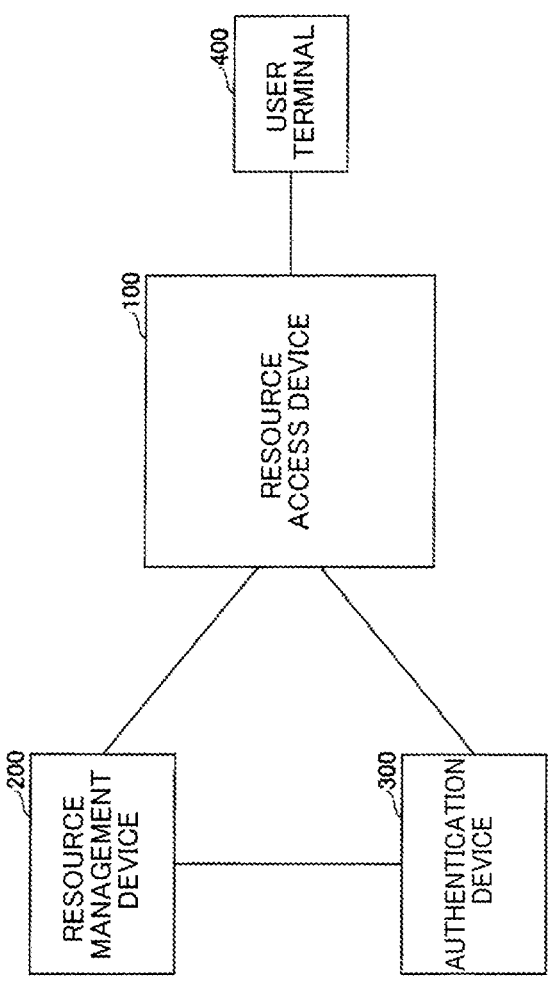
FIG. 1 is a diagram illustrating a system configuration according to an embodiment of the present invention.

FIG. 1 illustrates an exemplary configuration of a remote authorization control system according to the present embodiment. As illustrated in FIG. 1, the remote authorization control system according to the present embodiment includes a resource access device 100, a resource management device 200, an authentication device 300, and a user terminal 400, which are connected to a network. Although the resource access device 100 and the user terminal 400 are separate devices in the present embodiment, the user terminal 400 may include a function of the resource access device 100.

Further, the resource access device 100, the resource management device 200, and the authentication device 300 may be called a "local authorization & resource server," a "central resource server," and a "central authorization server," respectively.

Each of the resource access device 100, the resource management device 200, and the authentication device 300 may be a physical machine or a virtual machine on a cloud. 1t is assumed that the resource access device 100 is installed on an edge of a network or on a local network where there are users.

The resource access device 100 is a device that has a TEE, downloads an ACL from the authentication device 300, manages the ACL on a secure region of the TEE, and executes resource access control using the ACL. The resource access device 100 can execute any application such as a deep neural network (DNN) in an environment outside of the TEE. The environment outside of the TEE may be referred to a rich execution environment (REE).

The resource management device 200 manages resources. The authentication device 300 performs authentication processing, manages the ACL, and performs ACL issue control or the like. The user terminal 400 is a general terminal that includes a browser such as a PC and a smart phone.

(Functional Configuration of Control Device)

Figure 2:
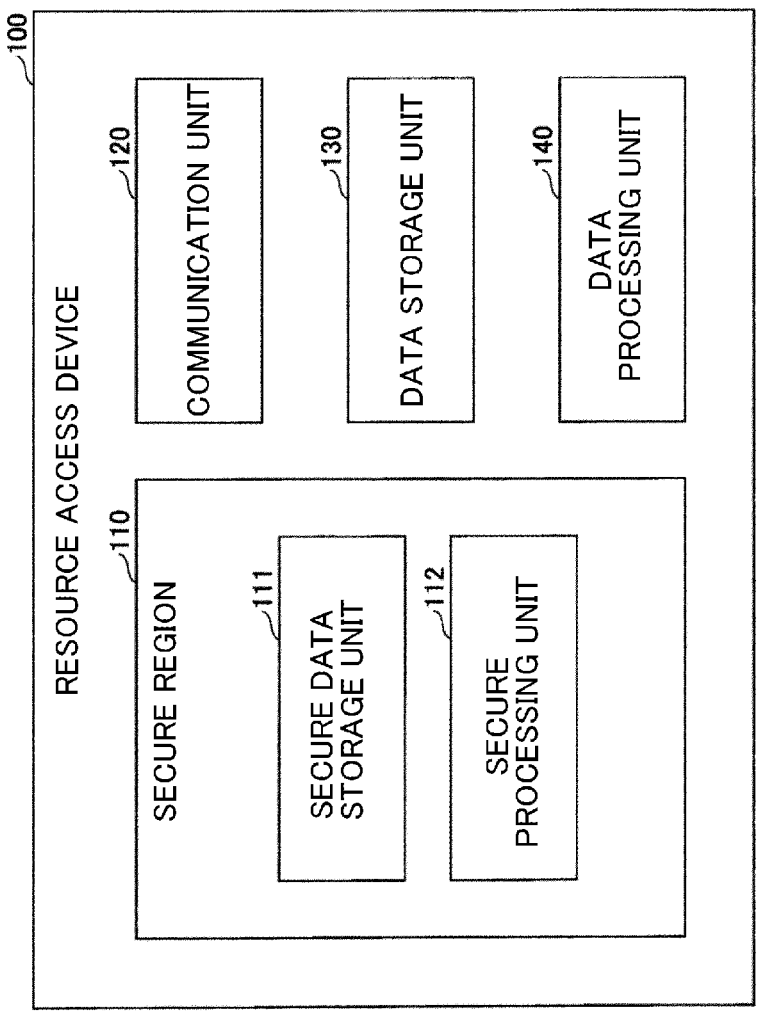
FIG. 2 is a diagram illustrating a configuration of a resource access device.

FIG. 2 illustrates an exemplary functional configuration of the resource access device 100. As illustrated in FIG. 2, the resource access device 100 includes a secure region 110, a communication unit 120, a data storage unit 130, and a data processing unit 140.

The secure region 110 is the above-described enclave and is a protected region where confidentiality is kept. Content of the data and the program in the data cannot be ascertained from the outside. Outside of the secure region 110, normal data storing, data processing (program execution), and transmission and reception can be performed.

In the secure region 110, data storing and data processing (program execution) can be performed while keeping confidentiality. FIG. 2 illustrates a secure data storage unit 111 and a secure processing unit 112 as functional units that perform these operations in the secure region 110. As will be described below, an application 160 is executed in the secure region 110. An application 150 is executed outside of the secure region 110.

The secure region 110 itself can be implemented by a technology of the related art. Any technology may be used as a technology of the related art for implementing the secure region 110. For example, the secure region 110 may be implemented as a separate chip which is hardware independent from a main CPU or a memory, or the secure region 110 may be implemented as software by utilizing an encryption technology and an authentication technology. As a technology for implementing the secure region 110 as software, there is, for example, the above-described SGX. In this embodiment, it is assumed that the SGX is used as an example.

The secure region 110 according to the present embodiment is an isolated execution environment where the resource access device 100 is dynamically activated (generated) in response to an instruction from a host application (an application operating outside of the secure region).

Figure 3:
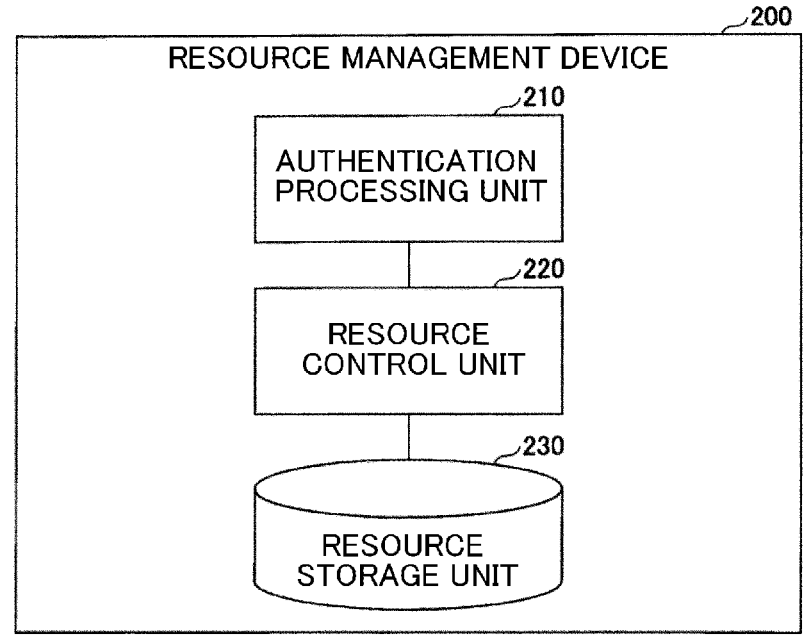
FIG. 3 is a diagram illustrating a configuration of a resource management device.

FIG. 3 is a diagram illustrating a functional configuration of the resource management device 200. As illustrated in FIG. 3, the resource management device 200 includes an authentication processing unit 210, a control unit 220, and a storage unit 230. The authentication processing unit 210 performs mutual authentication or the like in the secure region 110 between a remote attestation and an authentication device 300.

The resource storage unit 230 stores resources. The resource storage unit 230 may be located outside of the resource management device 200. The resource control unit 220 downloads resources or the like.

Figure 4:
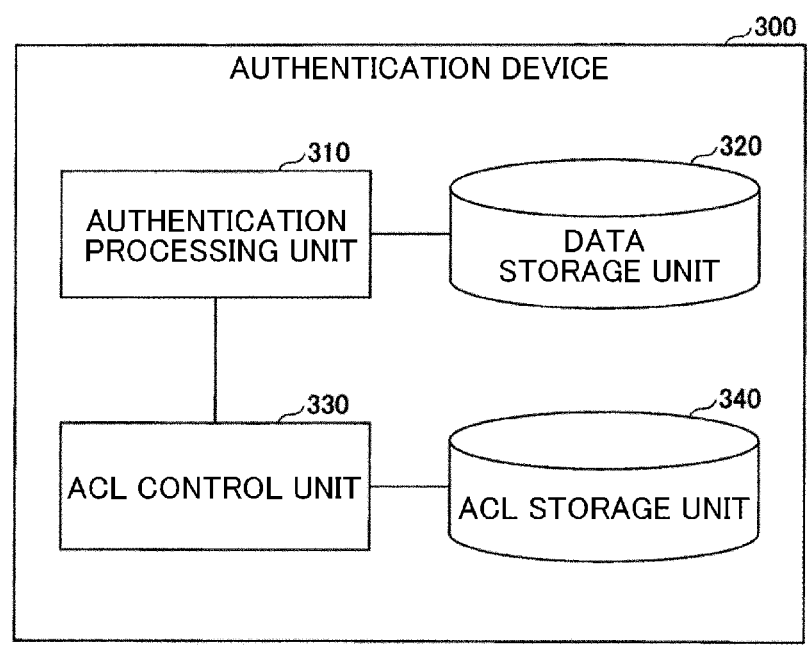
FIG. 4 is a diagram illustrating an authentication server.

FIG. 4 is a diagram illustrating a functional configuration of the authentication device 300. As illustrated in FIG. 4, the authentication device 300 includes an authentication processing unit 310, a data storage unit 320, an ACL control unit 330, and an ACL storage unit 340. The authentication processing unit 310 performs mutual authentication in the secure region 110 between the remote attestation and the resource management device 200 and performs fraud detection using a user ID and a TEE ID. Registration information or the like is stored in the data storage unit 320. The data storage unit 320 may be outside of the authentication device 300.

An ACL is stored in the ACL storage unit 340. The ACL storage unit 340 may be outside of the authentication device 300. The ACL control unit 330 downloads the ACL or the like.

Hereinafter, Examples 1 and 2 will be described as examples of more specific operations.

Example 1

Figure 5:
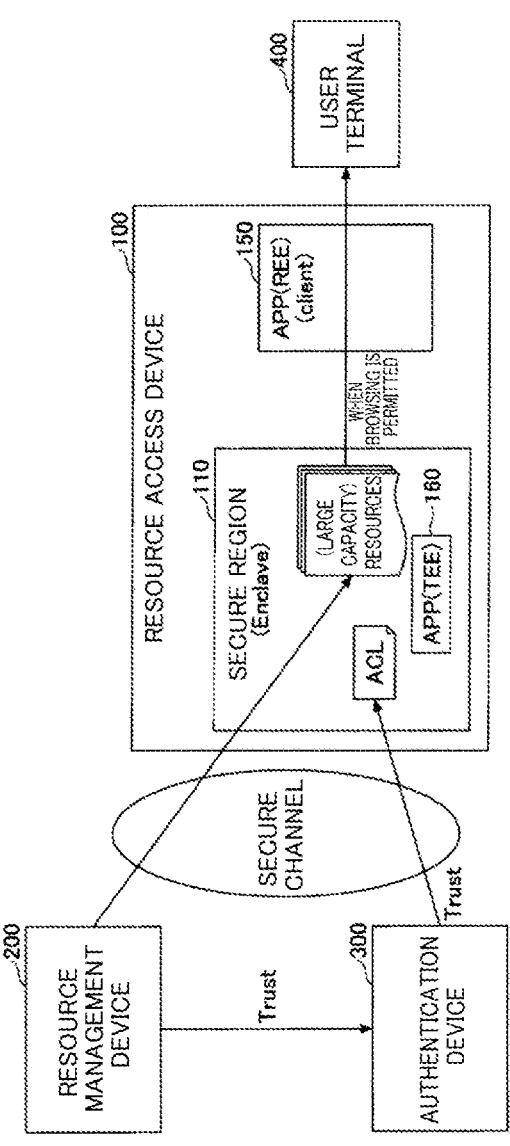
FIG. 5 is a diagram illustrating a system configuration according to Example 1.

FIG. 5 is a diagram illustrating a configuration according to Example 1. The application 150 (hereinafter referred to as an APP (REE) 150) operates outside of the secure region 110 (on the REE), and the APP (REE) 150 executes request/response processing on the user terminal 400, generation of the secure region 110, communication with the secure region 110 or the like. In the secure region 110, an application 160 (hereinafter referred to as an APP (TEE) 160) on the TEE operates, and the APP (TEE) 160 acquires ACL and resources and executes access control or the like by the ACL.

An ACL is downloaded from the authentication device 300 onto the secure region 110 in the resource access device 100. Resources are downloaded from the resource management device 200 into the secure region 110.

When the user terminal 400 requests resources, access control is executed by the APP (TEE) 160 of the secure region 110 using ACL only in a case in which authentication by the authentication device 300 is successful. When resource use is OK, the resources requested from the user are delivered to an APP (REE) 150, and the requested resources are transmitted to the user terminal 400 by the APP (REE) 150.

Hereinafter, a detailed operation according to Example 1 will be described with reference to the flowcharts in FIGS. 6 to 8. In actual processing, a third-party verification institution that executes mediation of a remote attestation, an authentication agent that certifies validity of a public key, and the like are also used, but these are general technologies and thus are not described in sequences.

<Operation in Initial Registration>

Figure 6:
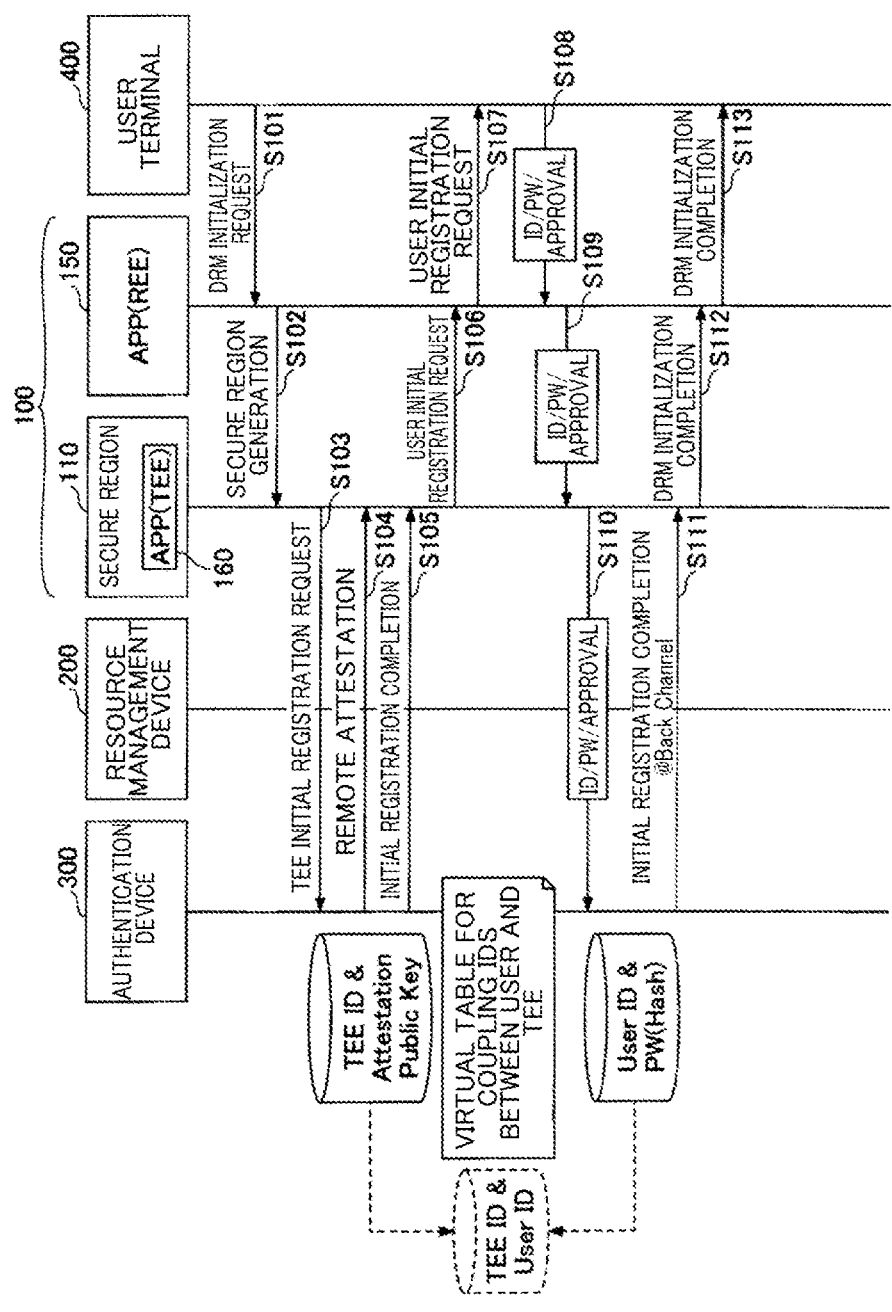
FIG. 6 is a sequence diagram according to Example 1.

FIG. 6 illustrates an operation in initial registration required for the user (the user terminal 400) to use resources.

In S101, the user terminal 400 transmits a DRM initialization request to the resource access device 100. The APP (REE) 150 of the resource access device 100 generates the secure region 110 when a DRM initialization request is received in S102. In the secure region 110, the APP (TEE) 160 performing subsequent processing is started. The APP (TEE) 160 transmits a TEE initial registration request to the authentication device 300 in S103.

The authentication processing unit 310 of the authentication device 300 receiving the TEE initial registration request executes remote attestation of the secure region 110 in S104. Here, it is assumed that the remote attestation is successful. The subsequent processing will be described assuming that the remote attestation is successful.

The authentication processing unit 310 acquires an ID (described as a TEE ID) of the secure region 110 through the remote attestation and stores the ID in the data storage unit 320 along with a public key (an attestation public key) corresponding to a signature key of the secure region 110.

In addition to the foregoing example, when the TEE ID and the public key are registered in the authentication device 300 in advance (or registered in a predetermined server), in S103, the resource access device 100 transmits the TEE ID to be used to the authentication device 300, and it may be confirmed that the TEE ID registered in the authentication device 300 is used.

In S105, the authentication processing unit 310 transmits a notification of initial registration completion to the resource access device 100. In S106, the APP (TEE) 160 transmits a user initial registration request to the app (REE) 150. In S107, the APP (REE) 150 transmits a user initial registration request to the user terminal 400.

In S108, the user terminal 400 transmits the user ID, the password, and information (described as "ID/PW/approval") indicating approval to the resource access device 100. The information indicating approval is information indicating approval to use the APP (REE) 150 and the APP (TEE) 160 in the secure region 110 in association.

The ID/PW/approval is transferred from the APP (REE) 150 to the APP (TEE) 160 to be transmitted from the APP (TEE) 160 to the authentication device 300 (S109 and S110).

The authentication processing unit 310 of the authentication device 300 receiving the ID/PW/approval stores hash values of the user ID and the password in the data storage unit 320. In the data storage unit 320, the TEE ID and the user ID are associated with each other, and a virtual table for coupling the user ID and the TEE ID is configured. A table for actually storing the user ID and the TEE ID in association may be used In S111, the authentication processing unit 310 transmits a notification of initial registration completion to the resource access device 100 in a back channel. A notification of DRM initialization completion is transmitted from the APP (TEE) 160 to the user terminal 400 via the APP (REE) 150.

<Operation in Resource DL Before Resource Use>

Figure 7:
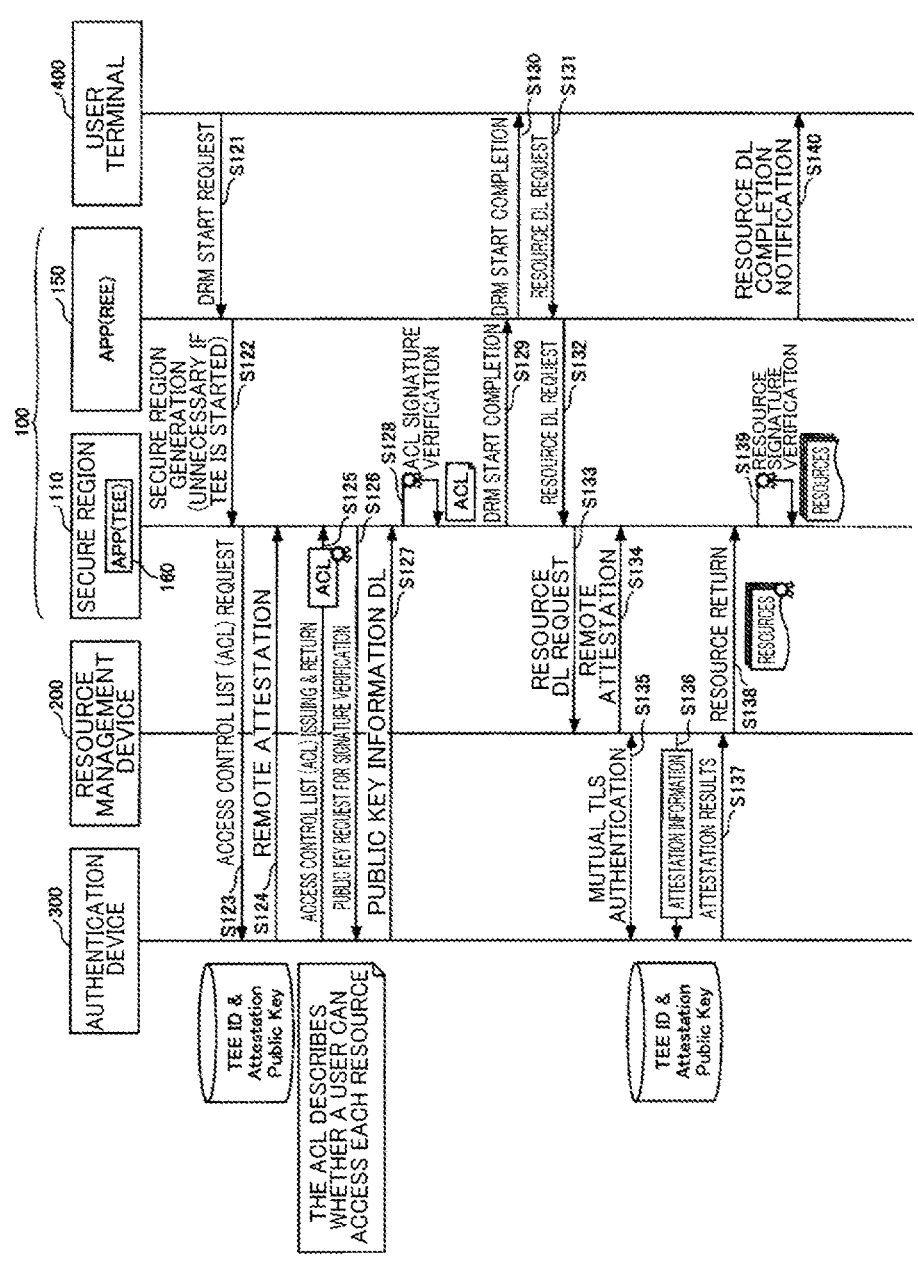
FIG. 7 is a sequence diagram according to Example 1.

FIG. 7 illustrates an operation until resources are downloaded to the resource access device 100 before the user (the user terminal 400) uses the resource.

In S121, the user terminal 400 transmits a DRM start request to the resource access device 100. In S122, the APP (REE) 150 generates the secure region 110. The APP (TEE) 160 executing subsequent processing in the secure region 110 is read and started. When the secure region 110 is being started, S122 is unnecessary.

In S123, the APP (TEE) 160 transmits an access control list (ACL) request to the authentication device 300.

The ACL storage unit 340 of the authentication device 300 stores an ACL describing accessibility of the user to each resource. The authentication processing unit 310 executes remote attestation to the secure region 110 in S124, reads the ACL from the ACL storage unit 340, adds a signature, and transmits the ACL to the APP (TEE) 160 in S125.

The APP (TEE) 160 receiving the ACL with the signature requests a public key for signature verification from the authentication device 300 in S126. In S127, the authentication processing unit 310 of the authentication device 300 transmits information regarding the public key to the APP (TEE) 160.

In S128, the APP (TEE) 160 performs the signature verification of the ACL using the received public key. Here, it is assumed that the signature verification is successful. In description, it is assumed that subsequent signature verification has been successful In S129 and S130, the APP (TEE) 160 notifies the APP (REE) 150 and the user terminal 400 of DRM start completion.

In S131, the user terminal 400 transmits a resource DL request to the resource access device 100. In the resource access device 100, the APP (REE) 150 notifies the APP (TEE) 160 of the resource DL request.

In S133, the APP (TEE) 160 transmits a resource DL request to the resource management device 200. In S134, the authentication processing unit 210 of the resource management device 200 executes remote attestation to the secure region 110 to acquire attestation information. The authentication processing unit 310 executes mutual TLS authentication with the authentication device 300 (S135).

In the attestation information, information regarding hardware and software used for the secure region 110 in the resource access device 100 is signed.

In S136, the authentication processing unit 210 transmits the attestation information to the authentication device 300. This corresponds to a request for signature verification. The authentication processing unit 310 of the authentication device 300 verifies the attestation information using a public key (an attestation public key) and transmits a verification result (an authentication result) to the resource management device 200 as an attestation result (S137).

Resources are stored in the resource storage unit 230 of the resource management device 200. When the authentication processing unit 210 of the resource management device 200 confirms validity (authenticity) of the secure region 110 in accordance with an attestation result of S137, the resource control unit 220 acquires resources from the resource storage unit 230. The signature is added and transmitted to the APP (TEE) 160 (S138). In S139, the APP (TEE) 160 performs signature verification of the resources.

In S140, the APP (REE) 150 transmits resource DL completion notification to the user terminal 400. In this state, since the resources are held in the secure region 110, the user terminal 400 cannot use the resources.

<Operation when Resources are Used>

Figure 8:
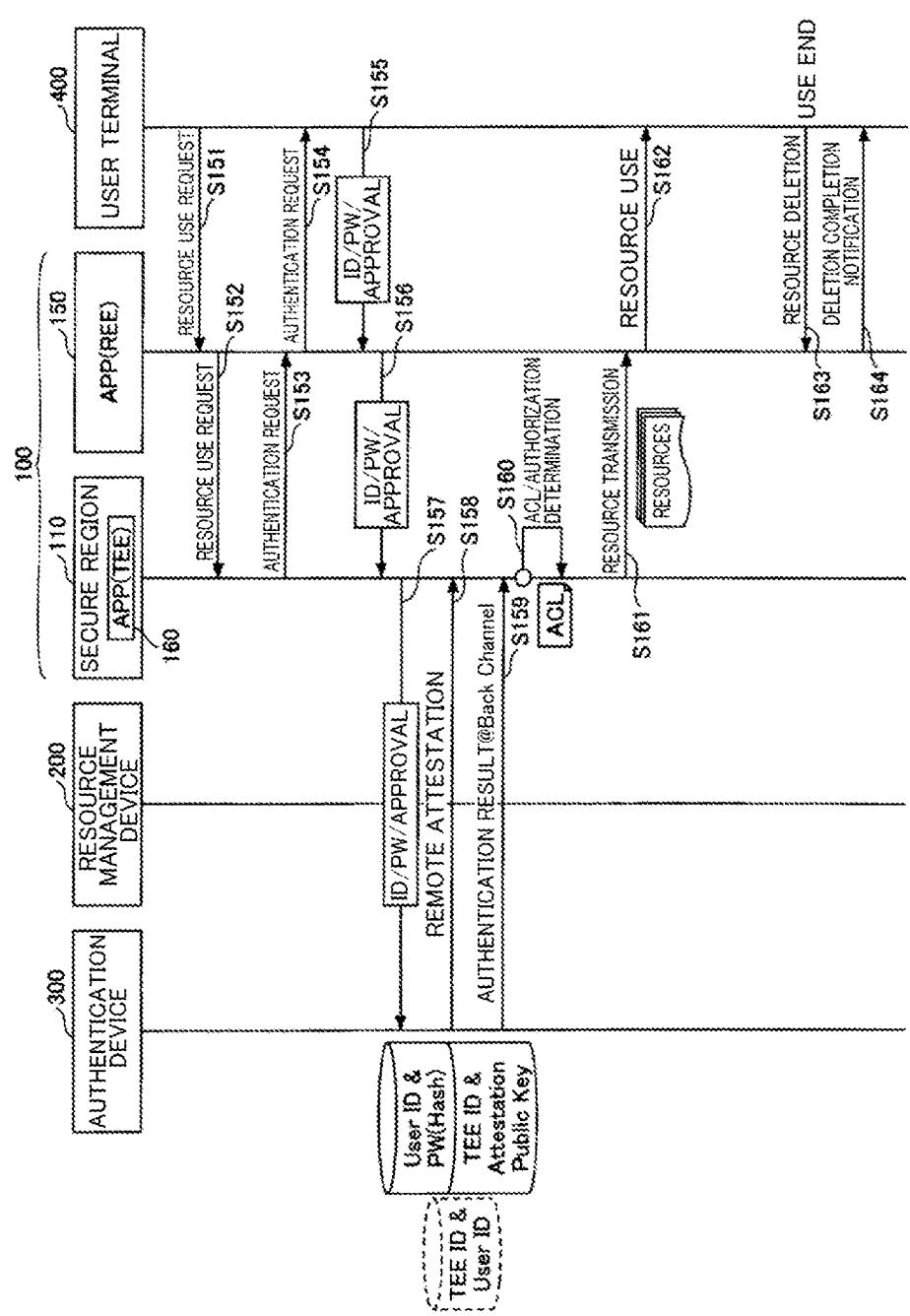
FIG. 8 is a sequence diagram according to Example 1.

FIG. 8 illustrates an operation when the user (the user terminal 400) uses resources. In S151, the user terminal 400 transmits a resource use request to the resource access device 100.

In S152, the APP (REE) 150 transmits a resource use request to the APP (TEE) 160. The APP (TEE) 160 receiving the resource use request transmits an authentication/authorization request to the APP (REE) 150. In S154, the APP (REE) 150 transmits an authentication/authorization request to the user terminal 400.

In S155, the user terminal 400 transmits ID/PW/approval to the resource access device 100. In S156, the APP (REE) 150 transmits ID/PW/approval to the APP (TEE) 160. In S157, the APP (TEE) 160 transmits ID/PW/approval to the authentication device 300.

The authentication processing unit 310 of the authentication device 300 executes a remote attestation to the secure region 110 and acquires a TEE ID of the secure region 110 in S158. The authentication processing unit 320 verifies validity of the resource use request from the user (determines whether the resource use request is illegal) by confirming whether the user ID acquired in S157 and the TEE ID acquired in S158 are associated with each other and stored in the data storage unit 320. Accordingly, the illegality can be detected when either the user ID (and a password) or the TEE is illegally used.

Here, on the assumption that the verification (authentication) is successful, the authentication processing unit 310 transmits an authentication result to the APP (TEE) 160 in S159. In S160, the APP (TEE) 160 receiving the authentication result determines whether the resources requested from the user can be used using the ACL held in the secure region 110.

Here, it is assumed that it is determined that the resources can be used. In S161, the APP (TEE) 160 transmits the resources to the APP (REE) 150. Accordingly, since the resources comes out of the secure region 110, the resources can be used by the user. Specifically, in S162, the APP (TEE) 160 transmits the resources to the user terminal 400.

When the use of the resources in the user terminal 400 ends, the user terminal 400 requests the APP (REE) 150 to delete the resources in S163. Accordingly, in the resource access device 100, resources outside of the secure region 110 are deleted. In S164, a deletion completion notification is transmitted to the user terminal 400.

In Example 1, when the DNN is used as resources, the DNN itself cannot be ascertained from the outside because the DNN is held in the secure region 110. That is, in Example since only a DNN execution result is known to the user, the intellectual property (here, the DNN) to be protected is protected.

Example 2

Figure 9:
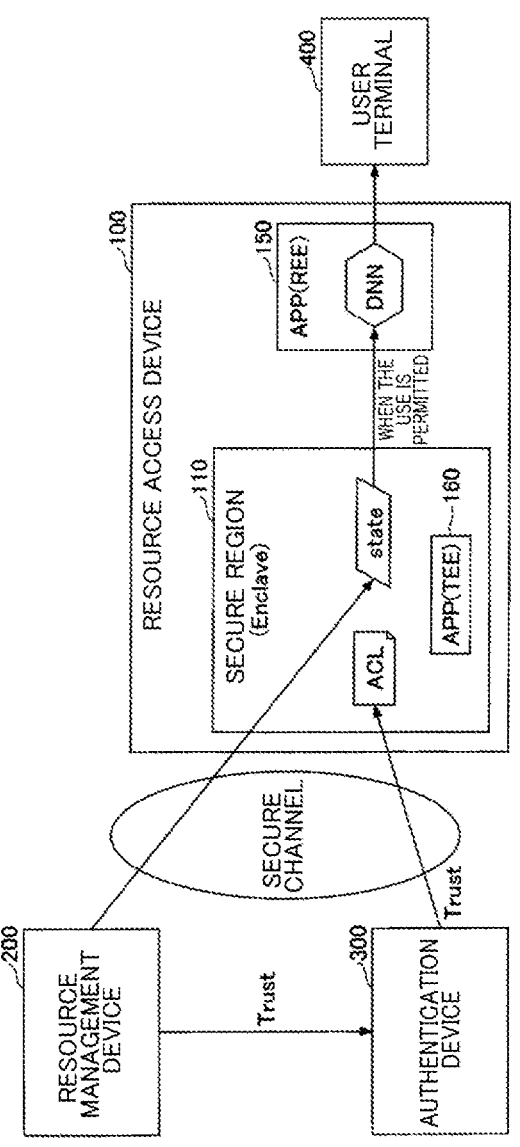
FIG. 9 is a diagram illustrating a system configuration according to Example 2.

Next, Example 2 will be described. FIG. 9 is a block diagram according to Example 2. The APP (REE) 150 operates outside of the secure region 110 (on the REE), and the APP (REE) 150 executes request/response processing to the user terminal 400, generation of the secure region 110, communication with the secure region 110, and the like.

In Example 2, the APP (REE) 150 executes inference by a deep neural network (DNN). A weight parameter of the DNN corresponds to "resources", and this is called a state in Example 2.

In the secure region 110, the APP (TEE) 160 on the TEE is operating, and the APP (TEE) 160 executes ACL or state acquisition, access control, and the like by the ACL.

The ACL is downloaded from the authentication device 300 to the secure region 110 in the resource access device 100. A state is downloaded from the resource management device 200 to the secure region 110. In the ACL, it is described whether the user can access each DNN (that is, each state).

When the user terminal 400 gives a request for using the DNN, access control in which the ACL is used is executed by the APP (TEE) 160 in the secure region 110 only when authentication by the authentication device 300 is successful. When the DNN use is OK, the state is set to the DNN of the APP (REE) 150, inference by the DNN using the state is executed, and an execution result is transmitted to the user terminal 400. Although the DNN is used as an inference scheme in Example 2, a machine learning scheme other than the DNN may be used. The DNN is an example of a machine learning program.

A detailed operation according to Example 2 will be described with reference to the flowcharts of FIG. 10 and FIG. 12. Since a sequence of Example 2 is basically the same as that of Example 1, portions different from those of Example 1 will be mainly described below.

<Operation in Initial Registration>

Figure 10:
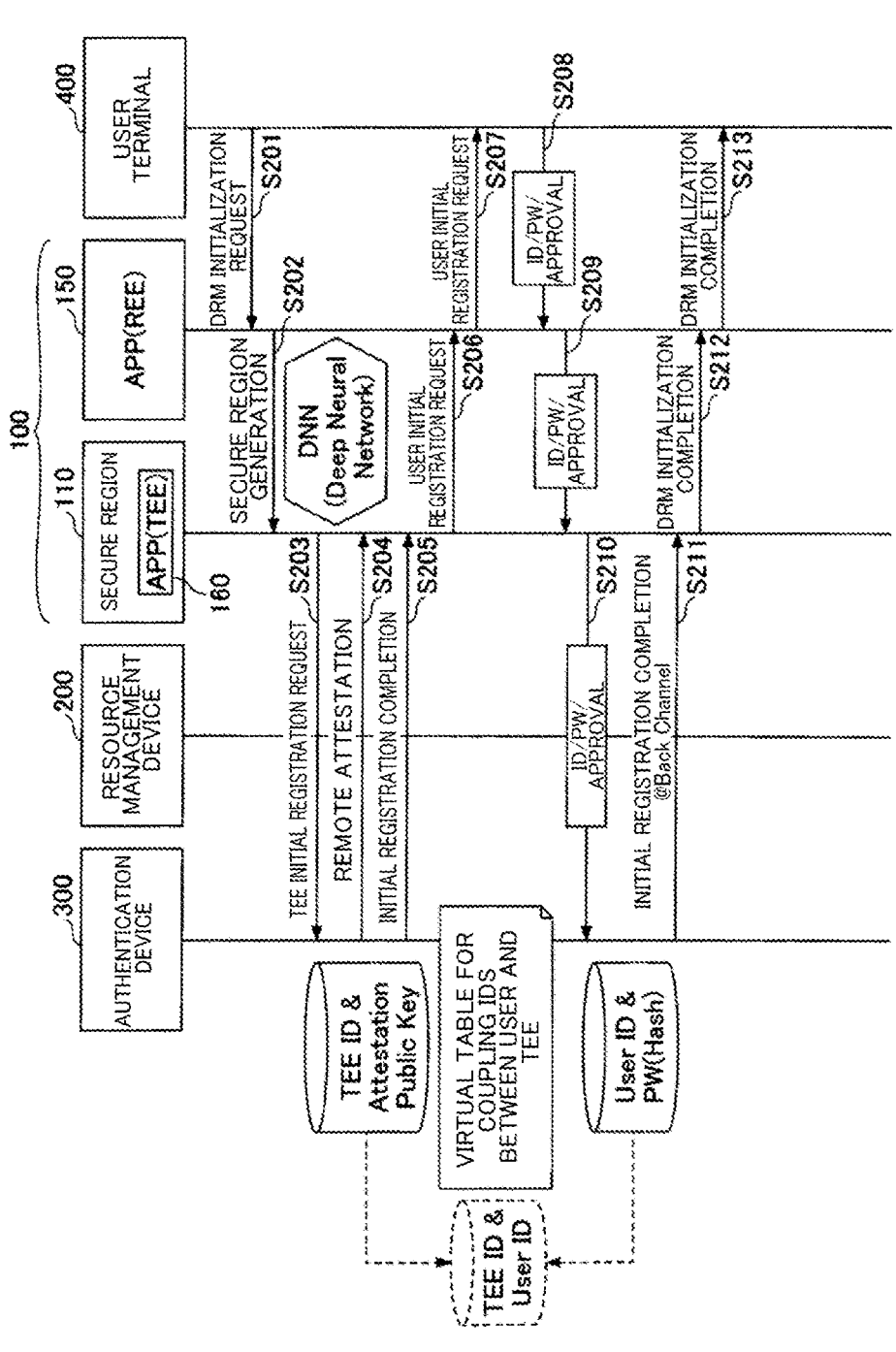
FIG. 10 is a sequence diagram according to Example 2.

FIG. 10 illustrates an operation in initial registration necessary for the user (the user terminal 400) to use the DNN. Processing of S201 to S213 is the same as the processing of S101 to S113 in Example 1 (see FIG. 6). A structure of the DNN is fixed when the secure region 110 is generated, but the weight parameter (state) can be changed later.

<Operation in State DL Before Use of DNN>

Figure 11:
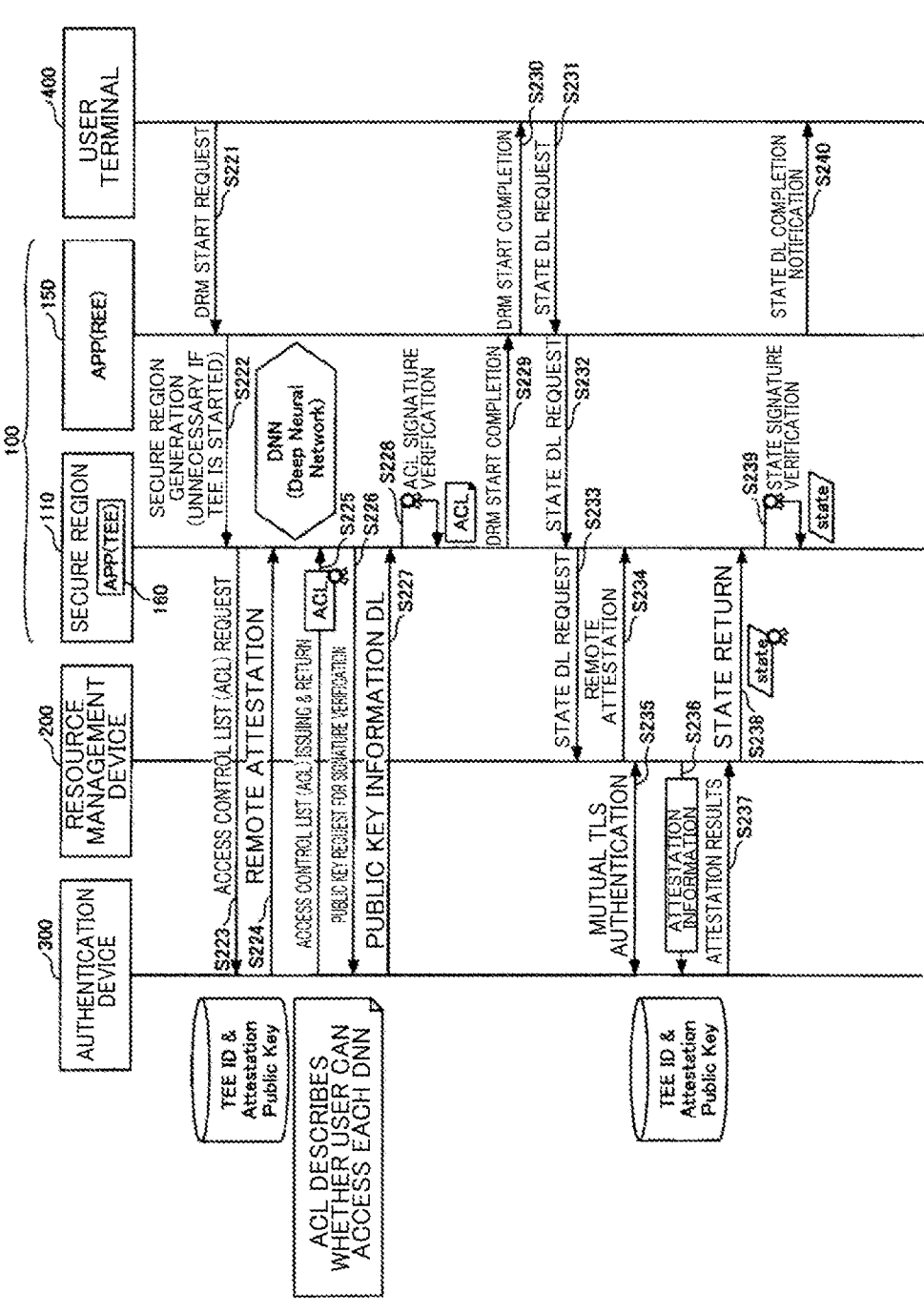
FIG. 11 is a sequence diagram according to Example 2.

FIG. 11 illustrates an operation until a state is downloaded to the resource access device 100 before the user (the user terminal 400) uses the DNN.

Processing of S221 to S240 in FIG. 11 is the same as those obtained by replacing the "resources" in the processing of S121 to S140 in Example 1 (FIG. 7) with "states."

<Operation when Resources are Used>

Figure 12:
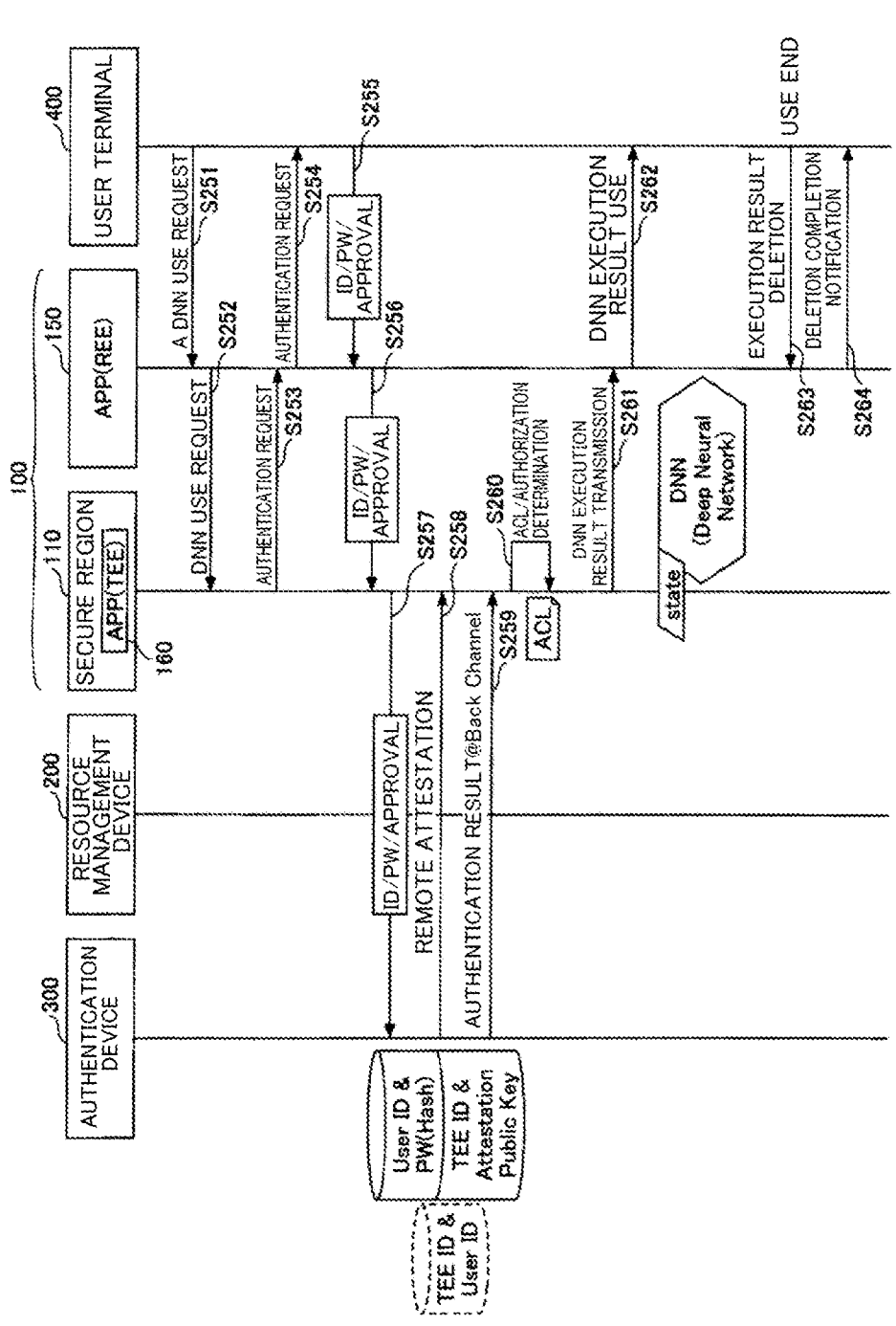
FIG. 12 is a sequence diagram according to Example 2.

FIG. 12 illustrates an operation when the user (the user terminal 400) uses the DNN. Processing of S251 to S260 in FIG. 12 is the same as the processing in which the "resources" in the processing of S151 to S160 in Example 1 (see FIG. 8) are replaced with the "DNN." The DNN use request is an example of the resource use request.

In S260, when it is determined that DNN use by the user is OK based on the ACL, the state is set to the DNN in S261, and inference by the DNN is executed. In S262, the APP (REE) 150 transmits a DNN execution result to the user terminal 400.

When the use of the DNN in the user terminal 400 ends, the user terminal 400 requests the APP (REE) 150 to delete an execution result in S263. Accordingly, in the resource access device 100, the execution result outside of the secure region 110 is deleted. In S264, deletion completion notification is transmitted to the user terminal 400.

In Example 2, since the state is held in the secure region 110 and is set to the DNN when the state is used, the state itself cannot be known from the outside. That is, in Example 2, since only the DNN execution result is known to the user, the intellectual property (the state in this case) to be protected is protected.

(Exemplary Hardware Configuration)

The resource access device 100, the resource management device 200, and the authentication device 300 can all be implemented by, for example, causing a computer to execute a program. This computer may be a physical computer or a virtual machine. The resource access device 100, the resource management device 200, and the authentication device 300 are collectively called "devices."

That is, each device can be implemented by executing a program corresponding to processing performed by the device using hardware resources such as a CPU and a memory embedded in a computer. It is possible to record the program on a computer-readable recording medium (a portable memory or the like) to store or distribute the program. It is also possible to provide the program through a network such as the Internet or an email.

Figure 13:
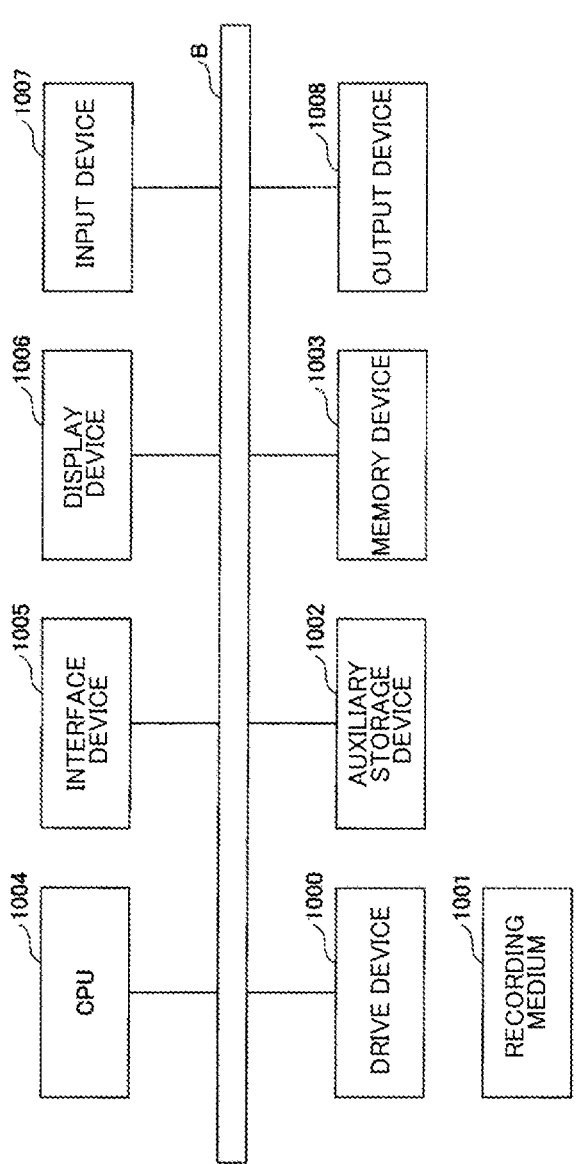
FIG. 13 is a diagram illustrating a hardware configuration of a device.

FIG. 13 is a diagram illustrating an exemplary hardware configuration of the computer. The computer illustrated in FIG. 13 includes a drive device 1000, an auxiliary storage device 1002, a memory device 1003, a CPU 1004, an interface device 1005, a display device 1006, an input device 1007, and an output device 1008 which are connected to each other by a bus BS. Some of the devices may not be included. For example, when display is not performed, the display device 1006 may not be included.

A program implementing processing in the computer is provided from a recording medium 1001 such as a CD-ROM or a memory card, for example. When the recording medium 1001 storing the program is set in the drive device 1000, the program is installed onto the auxiliary storage device 1002 from the recording medium 1001 via the drive device 1000. However, the program may not necessarily be installed from the recording medium 1001 and may be downloaded from another computer via a network. The auxiliary storage device 1002 stores the installed program and also stores required files, data, and the like.

The memory device 1003 reads and stores a program from the auxiliary storage device 1002 when an instruction to start the program is given. The CPU 1004 implements a function related to the device according to the program stored in the memory device 1003. The interface device 1005 is used as an interface for connection to a network. The display device 1006 displays a graphical user interface (GUI) or the like according to a program. The input device 1007 includes a keyboard, a mouse, buttons, and a touch panel, and is used to input various operation instructions. The output device 1008 outputs a calculation result.

(Advantageous Effects of Embodiment)

As described above, according to the technology of the present embodiment, a key required at least to realize the function is only a code signature key of a Trusted Application (an application operating in the secure region 110), This key is held in the resource management device 200 or the authentication device 300 and is not delivered to the user terminal 400 (or an area which can be accessed by a user in the resource access device 100). In the present embodiment, a problem in a DRM of the related art that there is no decryption key of the resources on the user terminal 400 (an area which can be accessed by the user) as in the DRM of the related art, and the decryption key may leak in the user terminal 400 or the like can be solved.

In the present embodiment, since the resources are downloaded onto the TEE of the resource access device 100 in advance, a download waiting time at the time of use authorization which is a problem in an access control system of the related art can be considerably reduced and edge processing can be performed instead of cloud processing. Therefore, availability is improved. This is particularly effective when a data size of the resources is large.

Conclusion of Embodiment

In the present specification, at least a remote authorization control system, a resource access device, an authentication device, a remote authorization control method, and a program are disclosed.

(Clause 1)

A remote authorization control system including:

a resource access device, a resource management device, and an authentication device, wherein the resource access device downloads an access control list from the authentication device onto a secure region in the resource access device, wherein the resource access device downloads resources from the resource management device onto the secure region, and wherein the resource access device determines whether a user is allowed to use the resources based on the access control list when a resource use request is received from the user, and the resources access device allows the user to use the resources when the resources are usable.

(Clause 2)

The remote authorization control system according to Clause 1, wherein the authentication device registers a user ID of the user and an ID of the secure region in association in initial registration, and wherein, when a request for using the resources is given from a user, presence or absence of illegality is determined by confirming whether the user ID transmitted from the user and the ID of the secure region acquired from the resource access device are registered as registration information.

(Clause 3)

The remote authorization control system according to Clause 1 or 2, wherein the resources are parameters of a machine learning program executed in the resource access device, and when the resources are available, the parameters are set in the machine learning program.

(Clause 4)

A resource access device included in a remote authorization control system, the remote authorization control system including the resource access device, a resource management device, and an authentication device, wherein the resource access device includes:

a unit configured to download an access control list from the authentication device onto a secure region in the resource access device;

a unit configured to download resources from the resource management device onto the secure region; and a unit configured to determine whether the user is allowed to use the resources, based on the access control list when a resource use request is received from the user, and to allow the user to use the resources when the resources are usable.

(Clause 5)

An authentication device included in a remote authorization control system, the remote authorization control system including a resource access device, a resource management device, and the authentication device, wherein the authentication device includes:

a unit configured to register a user ID of a user and an ID of a secure region in the resource access device in association in initial registration; and a unit configured to determine presence or absence of illegality by confirming whether the user ID transmitted from the user and the ID of the secure region acquired from the resource access device are registered as registration information when a request for using the resources is given from the user after download of the resources and the access control list on the secure region.

(Clause 6)

A remote authorization control method performed in a remote authorization control system, the remote authorization control system including a resource access device, a resource management device, and an authentication device, wherein the method includes:

a step of downloading, by the resource access device, an access control list from the authentication device onto a secure region in the resource access device;

a step of downloading, by the resource access device, resources from the resource management device onto the secure region; and a step of determining, by the resource access device, whether a user is allowed to use the resources based on the access control list when a resource use request is received from the user, and allowing the user to use the resources, by the resources access device, when the resources are usable.

(Clause 7)

A program causing a computer to function as each unit of the resource access device according to Clause 4.

(Clause 8)

A program causing a computer to function as each unit of the authentication device according to Clause 5.

Although the embodiment has been described above, the present invention is not limited to specific embodiments. Various modifications and changes can be made within the scope of the gist of the present invention described in the claims.

REFERENCE SIGNS LIST

100 Resource access device
110 Secure region
111 Secure data storage unit
112 Secure processing unit
120 Communication unit
130 Data storage unit
140 Data processing unit
150 APP (REE)
160 APP (TEE)
200 Resource management device
210 Authentication processing unit
220 Resource control unit
230 Resource storage unit
300 Authentication device
310 Authentication processing unit
320 Data storage unit
330 ACL control unit
340 ACL storage unit
400 User terminal
1000 Drive device
1001 Recording medium
1002 Auxiliary storage device
1003 Memory device
1004 CPU
1005 Interface device
1006 Display device
1007 Input device
1008 Output device

The invention claimed is:

1. A remote authorization control system comprising:
a resource access device;
a resource management device; and
an authentication device,
wherein the resource access device downloads an access control list from the authentication device onto a secure region in the resource access device,
wherein the resource access device downloads resources from the resource management device onto the secure region,
wherein in response to receiving a resource use request, the authentication device executes a remote attestation to the secure region, acquires an ID of the secure region, and verifies the resource use request using the ID of the secure region,
wherein in response to a successful verification of the resource use request, the resource access device determines whether a user is allowed to use the resources based on the access control list, and allows the user to use the resources when the resources are usable, and
wherein the resources include a weight parameter for a deep neural network executed in the resource access device, and the weight parameter is set to the deep neural network when the resources are usable.

2. The remote authorization control system according to claim 1,
wherein the authentication device registers a user ID of the user in association with the ID of the secure region in initial registration, and
wherein in response to receiving the resource use request, presence or absence of illegality is determined by confirming whether the user ID of the user and the ID of the secure region are registered as registration information.

3. A resource access device included in a remote authorization control system, the remote authorization control system including the resource access device, a resource management device, and an authentication device,
wherein the resource access device includes:
a memory; and
a processor coupled to the memory and configured to:
download an access control list from the authentication device onto a secure region in the resource access device;
download resources from the resource management device onto the secure region; and
in response to receiving a resource use request, and executing a successful verification of the resource use request, by the authentication device, using an ID of the secure region acquired through a remote attestation to the secure region, determine whether the user is allowed to use the resources, based on the access control list, and allow the user to use the resources when the resources are usable, and
wherein the resources include a weight parameter for a deep neural network executed in the resource access device, and the weight parameter is set to the deep neural network when the resources are usable.

4. A remote authorization control method performed in a remote authorization control system, the remote authorization control system including a resource access device, a resource management device, and an authentication device, wherein the method includes:
downloading, by the resource access device, an access control list from the authentication device onto a secure region in the resource access device;

downloading, by the resource access device, resources from the resource management device onto the secure region; and in response to receiving a resource use request, and executing a successful verification of the resource use request, by the authentication device, using an ID of the secure region acquired through a remote attestation to the secure region, determining, by the resource access device, whether a user is allowed to use the resources based on the access control list, and allowing the user to use the resources, by the resources access device, when the resources are usable, and wherein the resources include a weight parameter for a deep neural network executed in the resource access device, and the weight parameter is set to the deep neural network when the resources are usable.

5. A non-transitory computer-readable recording medium storing a program causing a computer to function as the resource access device according to claim 3.

\* \* \* \* \*